United States Patent [19]

Ramacher

[11] Patent Number: 4,642,977
[45] Date of Patent: Feb. 17, 1987

[54] TRASH SEPARATOR FOR HUT HARVESTER

[75] Inventor: Barry Ramacher, Stockton, Calif.

[73] Assignee: Ramacher Manufacturing Company, Linden, Calif.

[21] Appl. No.: 793,801

[22] Filed: Nov. 1, 1985

[51] Int. Cl.$^4$ ............................................. A01D 51/00
[52] U.S. Cl. .................................... 56/328 R; 56/16.5
[58] Field of Search .............. 56/16.5, 328 R, DIG. 8, 56/12.8

[56] References Cited

U.S. PATENT DOCUMENTS

| | | | |
|---|---|---|---|
| 3,872,657 | 3/1975 | Ramacher et al. | 56/328 R |
| 4,121,778 | 10/1978 | Quick | 56/16.5 |
| 4,174,001 | 11/1979 | Ellis | 56/16.5 |
| 4,364,222 | 12/1982 | Ramacher et al. | 56/328 R |
| 4,550,465 | 11/1985 | Chrisley | 56/328 R |

Primary Examiner—Gene Mancene
Assistant Examiner—David I. Tarnoff
Attorney, Agent, or Firm—Lothrop & West

[57] ABSTRACT

A nut harvester and separator, particularly for nuts such as pecans, almonds and walnuts, includes a wheeled frame drawn by a tractor over nut and trash windrows on the nut-orchard ground. Power-driven pick-up and lifting reels within a longitudinal plenum on the frame advance the picked-up material well into the plenum. A power-driven suction fan is open to the top of the plenum and draws atmospheric air into the plenum partially through a powered chain conveyor largely defining the bottom wall of the plenum. Atmospheric air is also drawn into the plenum through side inlets in an initial free fall zone of separation providing separation and removal of a large fraction of the light debris which is lifted through the suction fan and discharged to the atmosphere. Heavy, less aerodynamically responsive nuts are left behind to lodge on the conveyor along with the remaining fraction of light debris to form a blanket. The blanket restricts upward flow of air through the rearwardly moving conveyor until the leading edge of the blanket approaches the rearwardly converging downstream, or back, wall of the plenum where the Venturi effect of the wall helps to induce a vigorous updraft in the vicinity of the wall capable of disrupting the leading edge of the blanket where final separation of the debris takes place and the isolated nuts are discharged into a towed cart or other container.

12 Claims, 4 Drawing Figures

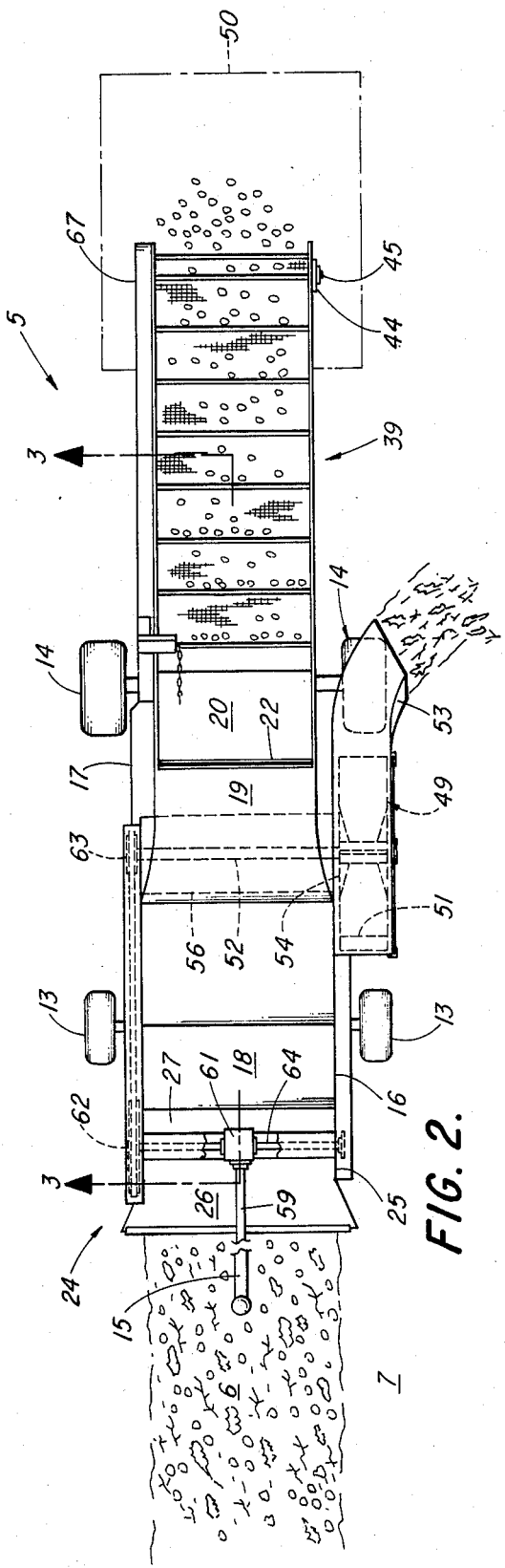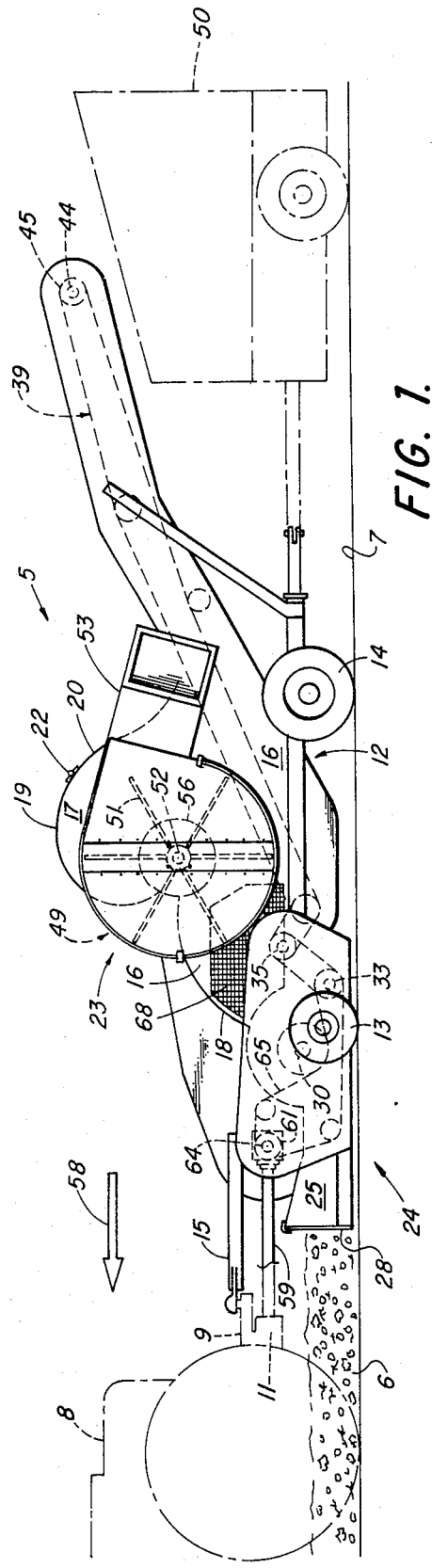

TRASH SEPARATOR FOR NUT HARVESTER

BACKGROUND OF THE INVENTION a. Field of the Invention

The invention relates to devices for separating nuts from the accompanying leaves and other debris picked up from the ground in an orchard by a nut harvester.

b. Description of the Prior Art

The following patents illustrative of the prior art are known to applicant:

Larsh U.S. Pat. No. 2,870,594;
Anderson et al U.S. Pat. No. 3,105,344;
Gustafson U.S. Pat. No. 3,107,475;
Ramacher U.S. Pat. No. 3,182,437;
Overstreet et al U.S. Pat. No. 3,475,889;
Patterson U.S. Pat. No. 3,520,123;
Brumbaugh et al U.S. Pat. No. 3,591,948;
Sides U.S. Pat. No. 3,626,677;
Ramacher U.S. Pat. No. 3,872,657;
Ramacher U.S. Pat. No. 3,962,072;
Ramacher U.S. Pat. No. 4,364,222.

Prior art devices, including most nut harvester-separators commercially available, are often forced to resort to multiple fans to provide sufficient power to induce an updraft capable of lifting a mixture of nuts and heavy trash, such as that encountered in pecan orchards, from a screen conveyor and of separating and removing the lighter and more aerodynamically responsive trash from the nuts which remain on the conveyor and are carried to a discharge.

While such devices have performed reasonably well for many years, most have suffered from a shortcoming inherent in over-separating in order to yield nuts uncontaminated by any trash remnants. This shortcoming is the concomitant loss of an undesirable percentage of valuable nut product which is returned to the orchard floor along with the trash.

BRIEF SUMMARY OF THE INVENTION

Nuts and accompanying leaves and other debris, even heavy trash such as that found in harvesting pecans, are picked up from the ground in an orchard by an advancing machine including an elongated, tunnel-like plenum which is fan-evacuated by a single fan and is defined on the bottom by a screen conveyor moving from near the front to the back of the machine. The materials are picked up by rotating pick-up drums in the forward portion of the plenum and are first advanced through a primary separation region in which the mixture of nuts and trash flowing in free fall condition are subjected to transverse air currents removing a large fraction of trash, with the remaining mixtue of nuts and trash descending toward and forming a blanket on the moving conveyor. As the blanket approaches the after wall of the plenum final separation occurs in a secondary transverse air flow region in which the leading edge of the advancing blanket of nuts and residual trash is vigorously disrupted by a vacuum-induced upflow of air, the leaves and other debris being sucked up and blown by the fan to the atmosphere while the remaining, separated nuts fall back onto the conveyor and are carried to a rear discharge.

BRIEF DESCRIPTION OF THE FIGURES OF THE DRAWING

FIG. 1 is an elevational view of one side of one preferred embodiment of the nut harvester and separator of the invention, a draft vehicle and a trailing nut cart being shown in broken line;

FIG. 2 is a top plan view thereof;

DETAILED DESCRIPTION

Figure 3:
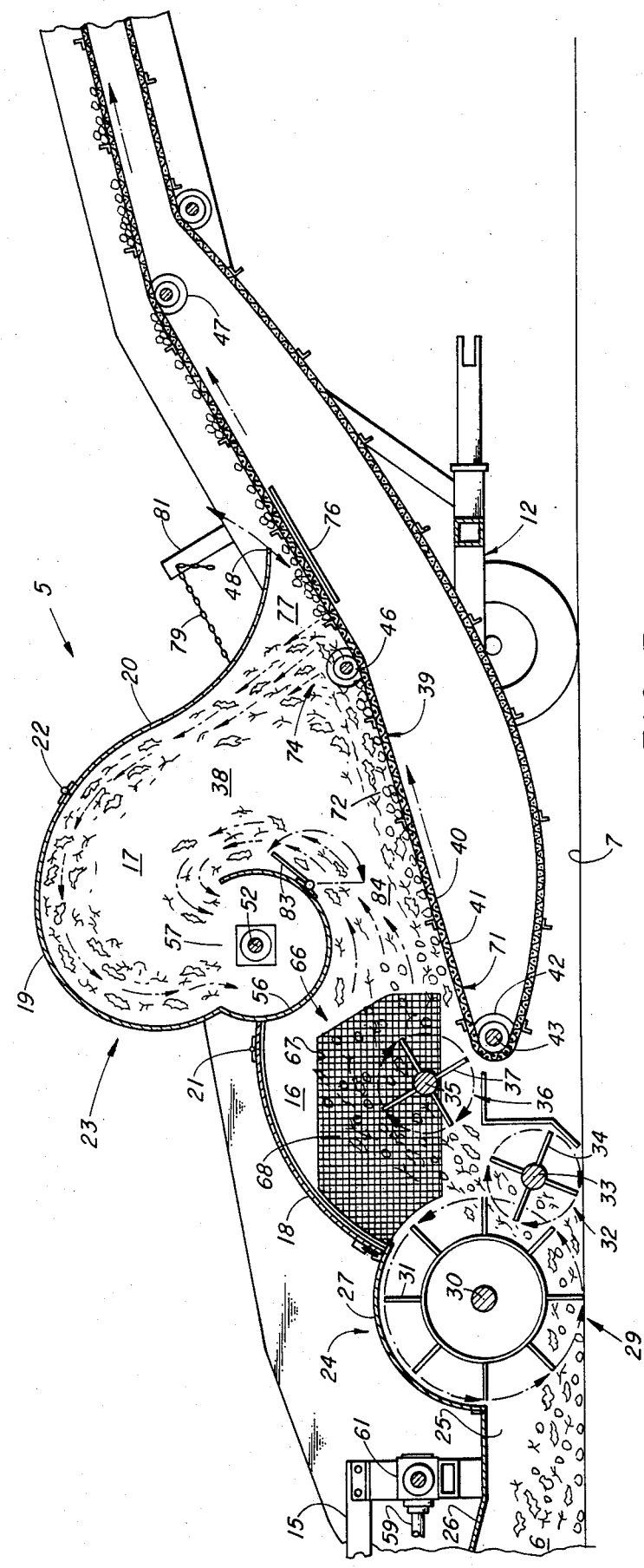
FIG. 3 is a fragmentary median, vertical, longitudinal, sectional view thereof, taken on the line 3—3 in FIG. 2; and, FIG. 4 is a view similar to that of FIG. 3 but showing another embodiment in which an endless belt conveyor is employed in the primary separation zone in lieu of a lifting reel.

The nut harvester and separator pursuant to the invention 5 is especially useful in picking up and separating a mixture of nuts and accompanying debris which have been by previous operations, deposited on the ground. The nuts and trash usually have been gathered together in relatively long, sometimes rather wide and high windrows between the tree rows. The nut harvester may be self-propelled; but in most instances it is advanced between the tree rows and over the ground by a standard tractor. As an example in the present instance, a windrow 6 of combined debris, trash and nuts lies on the ground 7 between tree rows and is traversed by a tractor 8 having not only a hitch 9, but a power take-off 11. The harvester itself includes a main frame 12 supported at the front by ground-engaging, preferably pneumatic, wheels 13 and similar rear ground-engaging wheels 14; and is afforded a hitch 15 to receive the hitch of the tractor. Furthermore, the harvester may be arranged for steering and maneuvering in general, but that is not disclosed herein, for it is not part of the present invention.

The harvester main frame 12 is effective to support a number of space-enclosing side plates 16 and 17 and top plates 18, 19 and 20 extending over a large part of the structure in a longitudinal or fore and aft direction. The top plate 18 is hinged at its after end by hinge 21 to afford access to the interior; and top plate 20 is hinged at its forward end by hinge 22 for purposes subsequently to be described in more detail. The side plates 16 and 17 and the top plates 18, 19 and 20 define, in part, an elongated tunnel-like plenum 23, with the bottom portion of the plate 20 serving as an after end wall to the plenum.

The plenum 23 begins at the forward end in a gathering or pick-up means 24 that is largely defined by side walls 25, by a planar top wall 26 and curved top wall 27. The forward portions of the side walls 25 and the top wall 26 diverge somewhat so that as the machine advances, the entire width of the windrow 6 can be gathered in and directed toward the center of advance of the machine. Depending from the forward end of the transverse top wall 26 is a number of strips 28 of flexible material, such as rubber, that yield to displacement by the materials encountered but tend to assist in forming a good converging inlet for the machine itself.

Immediately behind the inlet and well within the forward portion of the plenum 23 is a primary pick-up reel 29, or drum. This is mounted on the frame 12 by a transverse shaft 30 suitably supported in journals and extending about horizontally. The primary pick-up reel 29 is positioned to extend for the full width of the machine with its lowermost reaches approaching very close to or contacting the ground. Preferably, the reel 29 is made up not only of appropriate spiders (not shown) mounted on the shaft 30, but also has transversely extending paddles 31, or bats, or encounter material on the ground 7 and to displace it as the machine advances along the windrow 6.

Cooperating with the primary reel 29 is a secondary reel 32 mounted on a transverse shaft 33 having its axis parallel to that of the shaft 30 and arranged so that the bottom of the secondary pick-up reel 32 approaches or is in contact with the surface of the ground 7. Preferably, the secondary pick-up reel 32 although inclusive of bats 34, or paddles, is of about half the diameter of the primary reel 29 and has half the number of bats. The reels 29 and 32 are arranged to rotate counter to each other with their lower portions approaching each other near the ground and they are mechanically interconnected so that the various paddles 31 and 34 intersperse and cooperate to elevate and forcefully propel the nuts and trash in an upward and rearward direction, as shown in FIG. 3, for example.

Also spanning the forward portion of the plenum 23 on a shaft 35 parallel to the shafts 30 and 33 is a tertiary, or lifting reel 36 having paddles 37, or bats, arranged to rotate in the same direction as the secondary reel 32 and to assist the secondary reel 32 in flinging the material into a free fall arc, or into a buoyant or suspended condition while traversing the chamber below the top wall 18 of the plenum 23. The tertiary reel 36, in cooperation with the secondary reel 32 also assists in thrashing apart wads of material bound together by long grass and wet leaves and in dislodging sticks and the like which might otherwise block the flow of material.

On the machine and to the rear of the reels 29, 32 and 36 the opposite side plates 17 and the top plates 19 and 20 are configured to enclose and define a central zone 38 of the tunnel-like plenum 23. This middle portion of the plenum 23 is about the maximum width of the machine and also is substantially of greater height so that it encloses a large volume. The side plates 17 and the top plates 19 and 20 defining the enlarged portion of the plenum 23 extend a substantial distance toward the rear of the frame 12.

Also serving to act with the top and side plates to define a large portion of the bottom of the plenum 23 is a link belt conveyor 39. This is made up of chain sections 40 with cross bars 41. At its forward end the conveyor 39 is trained around sprockets 42 on a sprocket shaft 43. At its after upper end it is trained around sprockets 44 on a sprocket shaft 45 journaled on the frame upper portion 12. Intermediate sprockets 46 and 47 are also provided.

The conveyor 39 can be of various sizes and meshes, depending upon the particular commodity to be handled. In all cases, the path and function of the chain are substantially the same. The chain conveyor 39 assists in defining the lower portion of the plenum and extends through the plenum to emerge from the plenum into the atmosphere beneath the trailing tip 48 or trailing edge, of the curved top plate 20.

The top plate 20 is a continuation of the top plate 19 and is connected thereto for swinging movement about a horizontal axis by means of a hinge 22 as previously indicated. The hinged rear plate 20 is especially contoured initially to continue the curved shape of the top plate 19, but then to reverse curvature and converge very smoothly at the trailing tip 48 in almost a horizontal direction toward the adjacent upper run of the conveyor 39. Usually, the rear tip 48 of the plate 20 runs on or very close to the upper run of the conveyor 39. The hinged plate 20 can yield somewhat to allow nuts to ride under the trailing edge 48 of the plate 20 and to be carried along the upper, or higher, portion of the conveyor 39 to discharge over the upper, or after, end thereof into a nut cart 50, usually drawn by the harvester.

Particularly in accordance with the invention, and because much of the separation of the nuts from the trash is accomplished by gravity and by air currents, there is provided on the frame 12 a suction fan 49. This conveniently is a fan having blades 51 mounted on a cross shaft 52 extending the width of the machine and parallel to the shafts 30, 33 and 35. The suction fan 49 has an outlet directly to the atmosphere through a guiding duct 53, and has an inlet 54 opening into a transverse, partial tube 56 that extends substantially the entire width of the plenum 23. The suction tube 56 has a transversely extending opening 57 in the upper portion thereof spanning substantially the full width of the machine.

Thus, separated trash, such as leaves, twigs, dirt and the like, are removed from the plenum 23 by vacuum-induced air flow entering the tube 56 through the opening 57, thence into the fan scroll through the inlet 54 and emerging into the atmosphere after traversing the duct 53.

Since some present-day harvester equipment is self-powered, there may be provided a source of power on the frame 12 itself; but usually that is not so and the power take-off 11 of the tractor 8 shown herein is utilized. In setting up the equipment, the harvester-separator 5 and the tractor are brought into alignment in the general direction 58 they are to proceed or advance. The frame 12 is connected through the hitch 15 to the tractor hitch 9, and the power takeoff 11 of the tractor is connected through a drive shaft 59 to a gear box 61 on the frame 12.

Drive from the gear box can be arranged in various different ways. In this instance, a power pulley 62 on one side has the proper rotational speed and diameter to be connected by suitable belts to pulleys 63 on the suction fan shaft 52. From the gear box 61 another shaft 64 is connected through drive connectors 65 to the various shafts such as 30, 33 and 35 of the primary, secondary and tertiary pick-up reels.

When the tractor 8 begins to advance, the windrow 6 of nuts and debris of trash on the ground gradually come under the advancing forward portion of the plenum and are engaged by the various pick-up reels 29, 32 and 36. These first lift and then forcefully discharged the various materials in a generally upward and rearward direction, being assisted by the sub-atmospheric pressure within the tunnel due to operation of the suction fan 49.

In other words, as the machine advances and material is lifted into the air by the primary and secondary reels and begins to float along, the third or tertiary reel assists in propelling it upwardly and rearwardly and keeping it buoyant in the air in the initial, or primary separation zone 66, or region, located between an opposed pair of openings 67 in side plates 16, the openings 67 being covered by screens 68.

Atmospheric air is sucked in through the screened openings 67 in a direction approximately transverse to, or across the rearward flow of buoyant nuts, and accompanying leaves and other trash propelled into the primary separation zone 66 by the reels. It is important to note that the screened openings 67 are not subject to being blocked off or restricted by the suspended material, since air passageways therein ensure a constant air inflow through the openings. The vigorous turbulence created by the collision between the two transverse air currents is particularly effective in separating and removing the more aerodynamically responsive leaves and other trash. During the time the material is in this region of buoyancy, or suspension, or free fall, all of the surfaces are exposed to the swirling air currents and a very large fraction of the trash is separated out in the primary separation zone 66 and is immediately sucked into the fan and discharged.

When the lifting effect subsides, or slackens, as the nuts and remaining trash move rearwardly out of the initial separation zone 66, gravity tends to make the remaining picked-up material descend onto the subjacent, forward lower end 71 of the conveyor belt 39. As a result, a layer 72, or blanket, or bed, of nuts plus trash and debris is deposited beginning on the lower forward end 71 of the top run of the conveyor.

The blanket is quite impervious to the flow of air, thereby restricting upward air flow from the outside through that portion of the conveyor covered by the blanket 72. As the blanket 72 is carried toward the after end of the plenum and approaches the bottom portion of the top plate 20, the vacuum build-up in the plenum reaches a high level, creating a vigorous updraft in the vicinity of the end wall formed by the top plate 20, the location of this secondary, terminal zone of separation being generally indicated by the reference numeral 74.

The strong updraft disrupts the leading edge of the blanket as the blanket approaches the bottom portion of the after end wall 20 and elevates the mixture of nuts and residual trash, allowing the more aerodynamically responsive trash to be sucked up into the tube 56 and discharged through the duct 53 while the nuts fall back onto the conveyor belt 39. The separation effect is enhanced by the presence of a blocking plate 76 located below the conveyor belt in the vicinity of the trailing edge 48, or tip, of the hinged plate 20. A quiescent zone 77 is created by the plate 76, the isolated nuts dropping down and lodging on the conveyor belt as the nuts are carried beyond the leading edge of the blocking plate 76.

The nuts, free of trash, move upwardly and rearwardly beneath the hinged plate 20. The trailing edge 48 of the hinged plate 20 normally runs very close to the upper part of the conveyor chain but can yield as necessary when encountered by twigs and limbs too heavy to be removed by the vacuum induced updraft. This arrangement maintains the opening between the trailing edge 48 of the swinging plate 20 and the conveyor quite small so that not a great deal of atmospheric air is induced to flow in at this point.

Sometimes, in the event a larger opening is needed, there is afforded a chain adjuster 79 which can be manually set on an upright stop 81 on the frame. This allows some change of input air at this point and can be used to assist in regulating the extent of the vacuum within the plenum, especially when necessary to change the force or shape of the updraft in the secondary, or terminal, zone of separation 74.

Additional control is afforded by a hinged baffle 83 which serves to regulate the amount of opening at the throat 84 between the initial zone of separation 66 from the enlarged central zone 38 of the plenum where the suction fan and attendant conduits effect removal of the trash separated in both the initial zone 66 and terminal zone 74.

As the machine advances along the windrow over the ground, it continually picks up the nuts available and the debris that inevitably come therewith, effectuates an appropriate separation of the debris, dirt and nuts as they proceed through the tunnel of the machine, then discharges the debris and dirt to one side for return to the floor of the orchard, and separates the nuts and discharges them over the rear end of the machine into an appropriate nut cart for eventual recovery.

Figure 4:
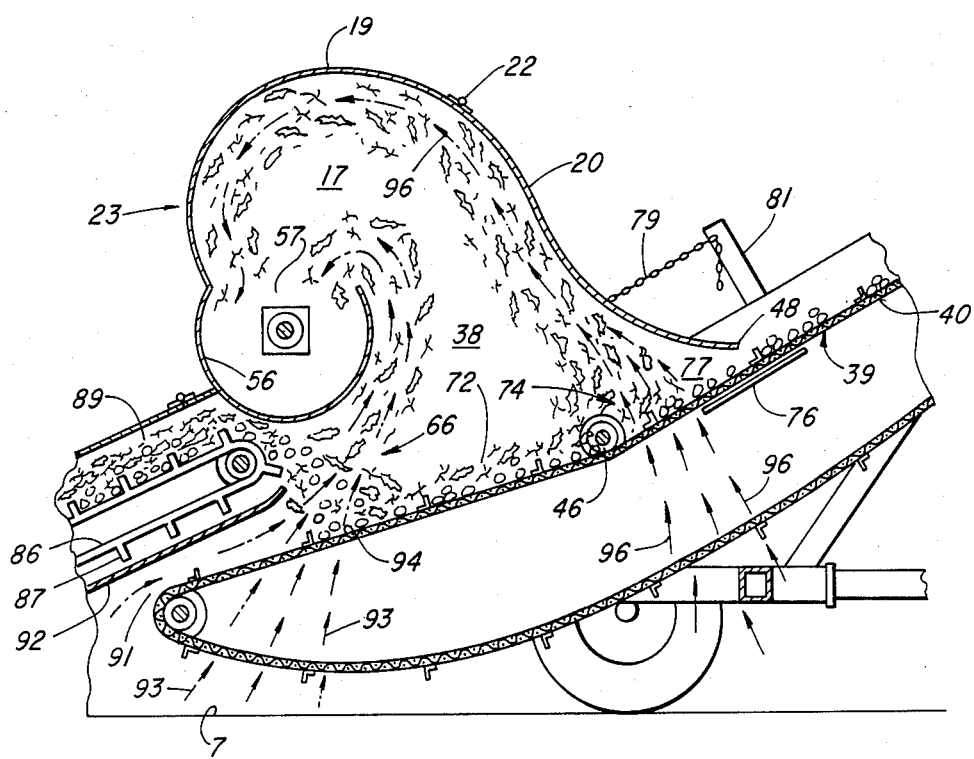

FIG. 4 illustrates a modified form of nut separator in which the tertiary or lifting reel 36 of the FIGS. 1-3 form of machine is replaced by an endless conveyor belt 86 having flights 87.

The belt 86, at its upper end, is trained around sprocketed shaft 88 suitably connected to a power source to move the upper run of the belt in a rearward direction. The upper run of the belt is loaded with a thick bed 89 of mixed trash and nuts picked up from a windrow of such material on the ground 7. Pick-up means similar to that disclosed in the FIGS. 1-3 harvester and separator can be utilized to elevate and deliver the mixtue of nuts and debris onto the upper run of the endless conveyor 86.

As the upper run of the conveyor reaches the end of its run and starts to recurve around the sprocketed shaft 88 the bed of material 89 is released into a free fall state into the throat 84 defined on the upper boundary by the bottom portion of the suction tube 56 and on the lower boundary by the adjacent portion of the foraminous conveyor 39.

The velocity imparted by the belt 86 to the nuts and debris as they separate from the belt launches them in free flight in a generally rearward direction while gravity tends to head them downwardly, as shown in FIG. 4.

During free fall, the nuts, and especially the more aerodynamically responsive trash, are subjected to a strong upflow of air through the gap 91 between the lower, or forward, turn of the chain conveyor 39 and an airflow guide plate 92 below the bottom run of the endless belt 86. A strong upflow of air also occurs through the foraminous conveyor 39, as shown by the arrows 93 indicating the direction of the upward and rearward air currents transverse to the downward and rearward descent, in free fall, of the mixed trash and nuts.

While in free fall state the light trash is especially vulnerable to aerodynamic forces, such as that imposed by the transverse air currents indicated by the arrows 93. Thus, a very large fraction of the debris is immediately stripped away from the nuts and residual debris and carried through the opening 57, thence into the suction tube 56 and suction fan, into the guide duct and into the atmosphere. The remaining trash and nuts are deflected somewhat from their normal flight path by the transverse air currents. Nevertheless, the residual material descends onto a landing zone 94 on the conveyor 39 and there builds a layer 72, or blanket, or bed, of leaves, twigs, dirt and nuts which is relatively impervious to the passage of fan-induced upflowing air. It is significant to note that owing to its forward position relative to the landing zone 94, the gap 91 is not susceptible to being blocked or choked off by the layer 72. Consequently, even under very heavy trash conditions, trash separating airfow will continue through the primary separation zone 66.

Owing to this relatively high resistance to airflow, the blanket remains substantially free of disruption during its migration from the area of deposit, or landing zone 94 to a location near the hinged back plate 20, where the secondary, or terminal, zone of separation 74 is located.

The relatively impervious blanket 72 serves also to reduce the area at the bottom of the plenum 23 through which air is free to flow. Thus, the vacuum induced in the plenum 23 by the single suction fan is maintained at a sufficiently high level to maintain a very brisk, or even vigorous, air flow in both the initial and the terminal regions of separation and removal.

This characteristic of the bed 72 also affords a desirable self-regulating capability to the overall system. In other words, in the event that an especially thick (i.e. high trash to nut ratio) layer lands on the landing zone 94, even less than usual air can permeate the blanket 72. As a consequence, the vacuum induced by the fan increases within the plenum and more air than usual is "sucked up" through the two separation zones, resulting in enhanced separation while the particularly heavy trash is present on the conveyor.

The reverse automatically occurs when the trash turns to lighter material.

As previously noted, adjustment of the chain 79 is a manual way of regulating upflow. Thus, when more than the ordinary amount of heavy trash is encountered, or particularly when the trash is damp or wet, manually lowering the trailing edge 48 of the hinged back plate 20 (by increasing the effective length of the chain 79) reduces the cross-sectional area of the air inlet for the plenum. Such an inlet restriction increases the vacuum within the plenum, and imposes more vigorous uplifting forces upon the trash.

As before, the secondary zone of separation 74 is located somewhat upstream from the lower portion of the back wall 20, the upflow through the conveyor belt being as generally indicated by the reference numeral 96. Upflow is enhanced by the Venturi effect of the bell-shaped back wall 20.

Here, again, the flow is transverse to the movement of the blanket 72 of mixed nuts and residual trash. While transverse upflow through the bottom of the plenum is not as effective as transverse flow through a freely falling curtain, the primary separation zone is capable of removing such a large fraction of debris that the task remaining for the secondary separation zone is relatively undemanding and the final separation efficiently removes the remaining trash.

As before, a blocking plate 76 is often found helpful in creating a zone of quiescence 77 adding to the efficiency of nut isolation at the site of last-chance separation, particularly when increased by the Venturi-like effect of the wall 20.

I claim:

1. A nut harvester and trash separator comprising:
   a. a longitudinally extending frame adapted to advance along the ground in a forward direction;
   b. a substantially solid top and side walls on at least the forward portion of said frame to define corresponding portions of a fore and aft elongated plenum, said plenum extending from a forward inlet portion to and after outlet portion;
   c. a foraminous conveyor belt on said frame forming the bottom portion of said plenum and extending longitudinally from a forward location on said frame near the ground past said after outlet portion and terminating at a rearward location on said frame substantially above the ground;
   d. a suction fan on said frame having an inlet in communication with said plenum;
   e. means for connecting the outlet of said fan directly to the atmosphere;
   f. means for picking up and delivering nuts and debris in a generally upward and rearward direction into the inlet portion of said plenum in free falling condition;
   g. primary separating means including at least one air inlet positioned at the inlet portion of said plenum for admitting atmospheric air into said plenum in a direction substantially transverse to the free falling travel of the nuts and debris in order to separate a portion of the more aerodynamically responsive debris while allowing the nuts and remaining portion of the debris to descend onto the lower forward end of said conveyor belt, forming an air impervious blanket over at least a portion of said conveyor belt;
   h. secondary separating means for removing said remaining portion of the debris from the nuts, defined by a transverse updraft passing through said conveyor belt in the region betwen the leading edge of said blanket and said outlet portion of said plenum; and,
   i. means for releasing the isolated nuts from said plenum near the rearward portion of said conveyor belt.

2. A nut harvester and trash separator comprising:
   a. a longitudinally extending frame adapted to advance along the ground in a forward direction;
   b. a substantially solid top and side walls on at least the forward portion of said frame to define corresponding portions of a fore and aft elongated plenum, said plenum extending from a forward inlet portion to an after outlet portion;
   c. a foraminous conveyor belt on said frame forming the bottom portion of said plenum and extending longitudinally from a forward location on said frame near the ground past said after outlet portion and terminating at a rearward location on said frame substantially above the ground;
   d. a suction fan on said frame having an inlet in communication with said plenum;
   e. means for connecting the outlet of said fan directly to the atmosphere;
   f. means for picking up and delivering nuts and debris in a generally downward and rearward direction into the inlet portion of said plenum in free falling condition;
   g. primary separating means including at least one air inlet positioned at the inlet portion of said plenum for admitting atmospheric air into said plenum in a direction substantially transverse to the free falling travel of the nuts and debris in order to separate a portion of the more aerodynamically responsive debris while allowing the nuts and remaining portion of the debris to descend onto the lower forward end of said conveyor belt, forming an air impervious blanket over at least a portion of said conveyor belt;
   h. secondary separating means for removing said remaining portion of the debris from the nuts, defined by a transverse updraft passing through said conveyor belt in the region between the leading edge of said blanket and said outlet portion of said plenum; and, i. means for releasing the isolated nuts from said plenum near the rearward portion of said conveyor belt.

3. A nut harvester and trash separator as in claim 2 in which said means for picking up and delivering nuts and debris includes a second conveyor belt, directed upwardly and rearwardly and in which said air inlet is positioned beneath said second conveyor belt and forward from the trailing edge of said blanket, providing a constant upflow of air not subject to blockage from the free falling nuts and debris.

4. A nut harvester and separator as in claim 1 including a primary pick-up reel in the forward portion of said plenum; means for mounting said primary pick-up reel on said frame to rotate about a transverse, horizontal first axis with the bottom of said primary reel close to the ground; a secondary pick-up reel in the forward portion of said plenum; means for mounting said secondary pick-up reel on said frame just rearwardly of said primary pick-up reel for rotation about a second axis parallel to said first axis with the bottom of the secondary reel close to the ground; transverse bats on the periphery of each of said pick-up reels; means for rotating both of said pick-up reels in synchronism to intersperse said bats with each other; a tertiary reel in the vicinity of said air inlet means for mounting said tertiary reel on said frame to rotate about a transverse, horizontal third axis parallel to said second axis; transverse bats on the periphery of said tertiary reel; and means for rotating said tertiary reel in a direction such that the bats direct the nuts and debris in a free fall arc adjacent said air inlet.

5. A nut harvester and separator as in claim 1 including a primary pick-up reel and a secondary pick-up reel; means for mounting said reels within the forward portion of said plenum for rotation about respective parallel transverse axes with the lowermost portions of said primary and secondary reels adjacent the ground; a lifting reel; means for mounting said lifting reel within the forward portion of said plenum above and rearwardly of said primary and secondary reels and for rotation about a tertiary axis parallel to said transverse axis; and means for rotating said lifting reel about said tertiary axis in the same direction as said secondary pick-up reel.

6. A nut harvester and separator as in claim 1 including a substantially tubular suction fan duct extending transversely from said fan inlet opening and between said side walls of said plenum in the upper portion of said plenum, said duct being substantially closed along the bottom portion thereof and having an opening into said plenum at the upper rearward portion of said duct.

7. A nut harvester and separator as in claim 1 in which said top wall includes a forward stationary plate and a rearward plate and means for hinging the forward edge of said rearward plate to the rearward edge of said forward plate for rotation of said rearward plate about a transverse axis.

8. A device as in claim 7 including means for limiting said rotation of said rearward plate.

9. A nut harvester and separator as in claim 7 in which said rearward plate has a rearward portion overlying and converging into close proximity to the upper run of the discharge portion of said conveyor belt adapted for substantially vertical movement toward and away from said conveyor belt.

10. A nut harvester and trash separator as in claim 6 including a blocking plate located immediately below and parallel to the adjacent upper rim of said conveyor belt, said blocking plate extending forwardly from where said conveyor belt emerges from the outlet portion of said plenum to afford a quiescent zone aabove said belt and ahead of the outlet portion of said plenum for the isolation of nuts from which residual debris has been separated while migrating from the inlet portion of said plenum toward the outlet portion thereof.

11. A nut harvester and separator as in claim 1 in which said air inlet is located above and forward from said lower forward end of said conveyor belt, providing a constant air inflow not subject to blockage from the free falling nuts and debris.

12. A nut harvester and separator as in claim 11 including a pair of air inlets in said side walls of said plenum.

* * * * *